United States Patent
Avila et al.

[11] Patent Number: 6,064,331
[45] Date of Patent: May 16, 2000

[54] PULSE REPETITION FREQUENCY SECTION METHOD AND SYSTEM

[75] Inventors: Louis J. Avila, Costa Mesa; Prentiss N. Robinson, Anaheim, both of Calif.

[73] Assignee: Boeing North American, Inc., Seal Beach, Calif.

[21] Appl. No.: 09/096,850

[22] Filed: Jun. 11, 1998

[51] Int. Cl.$^7$ .............................. G01S 13/12; G01S 13/66
[52] U.S. Cl. ................. 342/59; 342/61; 342/73; 342/82; 342/88; 342/94; 342/95; 342/118; 342/134; 342/137; 342/192; 342/195
[58] Field of Search .................. 342/61, 62, 67, 342/82, 88, 89, 94, 95, 104, 105, 134, 135, 136, 92, 195, 202, 59, 109, 137, 73, 118, 175

[56] References Cited

U.S. PATENT DOCUMENTS

| | | | |
|---|---|---|---|
| 2,703,399 | 3/1955 | Williams et al. | 342/88 X |
| 4,143,373 | 3/1979 | Chernick | 342/88 |
| 4,593,286 | 6/1986 | Mathews et al. | 342/88 |
| 4,746,922 | 5/1988 | Prenat | 342/88 |
| 5,061,934 | 10/1991 | Brown et al. . | |
| 5,173,706 | 12/1992 | Urkowitz . | |
| 5,185,608 | 2/1993 | Pozgay . | |
| 5,294,933 | 3/1994 | Lee et al. . | |
| 5,311,189 | 5/1994 | Nagel . | |
| 5,440,311 | 8/1995 | Gallagher et al. . | |
| 5,486,830 | 1/1996 | Axline, Jr. et al. . | |
| 5,546,084 | 8/1996 | Hindman . | |

OTHER PUBLICATIONS

Merrill I. Skolnik, "Introduction to Radar Systems"; (McGraw–Hill, New York, 1980, 2nd edition); pp. 53–54.

*Primary Examiner*—Bernarr E. Gregory
*Attorney, Agent, or Firm*—Stout, Uxa, Buyan & Williams, LLP; Donald E. Stout

[57] ABSTRACT

The objectives of the invention are met by an improved radar tracking system and a process of radar tracking. In the improved system and process, an estimate of a target range and a range uncertainty swath from a first radar system is inputted into a second radar system along with a duty factor. The second radar system determines a set of zero eclipse intervals and respective ranges of range pulse repetition frequencies that solves a first set of equations. A usable range pulse repetition frequency is chosen from the results. Next, an estimated target Doppler frequency region and a Doppler uncertainty swath is inputted into the second radar system. The second radar system is instructed to determine a set of clear Doppler frequency region intervals, and respective ranges of Doppler frequency pulse repetition frequencies by solving a second set of equations. A usable pulse repetition frequency is chosen that is present in at least one of the ranges of range pulse repetition frequencies and that is present in at least one of the ranges of Doppler frequency pulse repetition frequencies. The second radar system is then instructed to track the target using the usable pulse repetition frequency.

17 Claims, 4 Drawing Sheets

PULSE REPETITION FREQUENCY SECTION METHOD AND SYSTEM

The subject invention was made with Government support under Contract DAAH01-95C-0021. The Government has certain rights in this invention.

BACKGROUND OF THE INVENTION

1. Field of the Invention

The present invention relates to radar tracking systems, and, more specifically, to systems which correct for eclipsing by transmitted pulses and/or cluttering of the Doppler frequency interval.

2. Description of the Related Art

To detect and track a target, Doppler radars must consider two problems when selecting a PRF. One is the signal-to-noise ratio (SNR) and the other is the signal-to-clutter ratio (SCR) it can achieve on the target of interest. A high duty factor with little or no eclipsing may be required to achieve an adequate SNR while the target's Doppler frequency should not overlap the Doppler frequency of the clutter to obtain the highest SCR.

High PRF radars use PRFs sufficiently high so the target return is not masked by clutter returns to ensure a high SCR. This PRF must be greater than the full Doppler clutter bandwidth ($4*Vr/\lambda$) plus the maximum target Doppler frequency of interest ($2*Vt/\lambda$) where Vr is the radar's velocity, Vt is the target's velocity along the line of sight to the radar and $\lambda$ is the transmission wavelength of the radar. Range eclipsing is very severe when high PRFs are used since the transmitted pulse occurs at ranges of $n*c/2*PRF$ where c is the velocity of light and n is an integer from 0 to infinity. Thus eclipsing occurs at each of these ranges over the interval covered by the transmitted pulse ($c*\tau/2$) where $\tau$ is the time duration of the transmitted pulse which may result in an inadequate SNR.

Low PRF radars use sufficiently low PRFs such that the range between pulses $n*c/2*PRF$ greater than the greatest target range of interest. Then eclipsing of interest only occurs for ranges less than the short ranges covered by the pulsewidth ($c*\tau/2$). However, the clutter return now occurs around every PRF line ($n*PRF$) and the target return is quite likely to be masked by the clutter return yielding a poor SCR.

Thus medium PRF systems are often used to provide a compromise between these extremes. Current medium PRF radar systems use several PRFs to ensure seeing a target over a wide range interval and/or Doppler frequency interval (to avoid significant eclipsing of the target return signal by the transmitted pulse in the time domain and to avoid having clutter mask the desired target return in the frequency domain). They may process the returns from each PRF independently or integrate the returns of the different PRFs. This patent presents a method of rapidly and automatically selecting a PRF to yield no eclipsing and no clutter masking given the target range and target Doppler frequency are approximately known and given such a solution is realizable. This algorithm therefore permits higher target update rates since multiple PRFs need not be processed.

SUMMARY OF THE INVENTION

An improved radar tracking system and a process of radar tracking inputs estimates of a target range and a range uncertainty swath from a first radar system into a second radar system along with a duty factor. The second radar system determines a set of zero eclipse intervals and respective ranges of range pulse repetition frequencies that solves a first set of equations. A usable range pulse repetition frequency is chosen from the results. Next, an estimated target Doppler frequency region and a Doppler uncertainity swath is inputted into the second radar system. The second radar system is instructed to determine a set of clear Doppler frequency region intervals, and respective ranges of Doppler frequency pulse repetition frequencies by solving a second set of equations. A usable pulse repetition frequency is chosen that is present in at least one of the ranges of range pulse repetition frequencies and that is present in at least one of the ranges of Doppler frequency pulse repetition frequencies. The second radar system is then instructed to track the target using the usable pulse repetition frequency.

The present invention, together with additional features and advantages thereof, may best be understood by reference to the following description taken in connection with the accompanying illustrative drawings.

DESCRIPTION OF THE PREFERRED EMBODIMENTS

Figure 1:
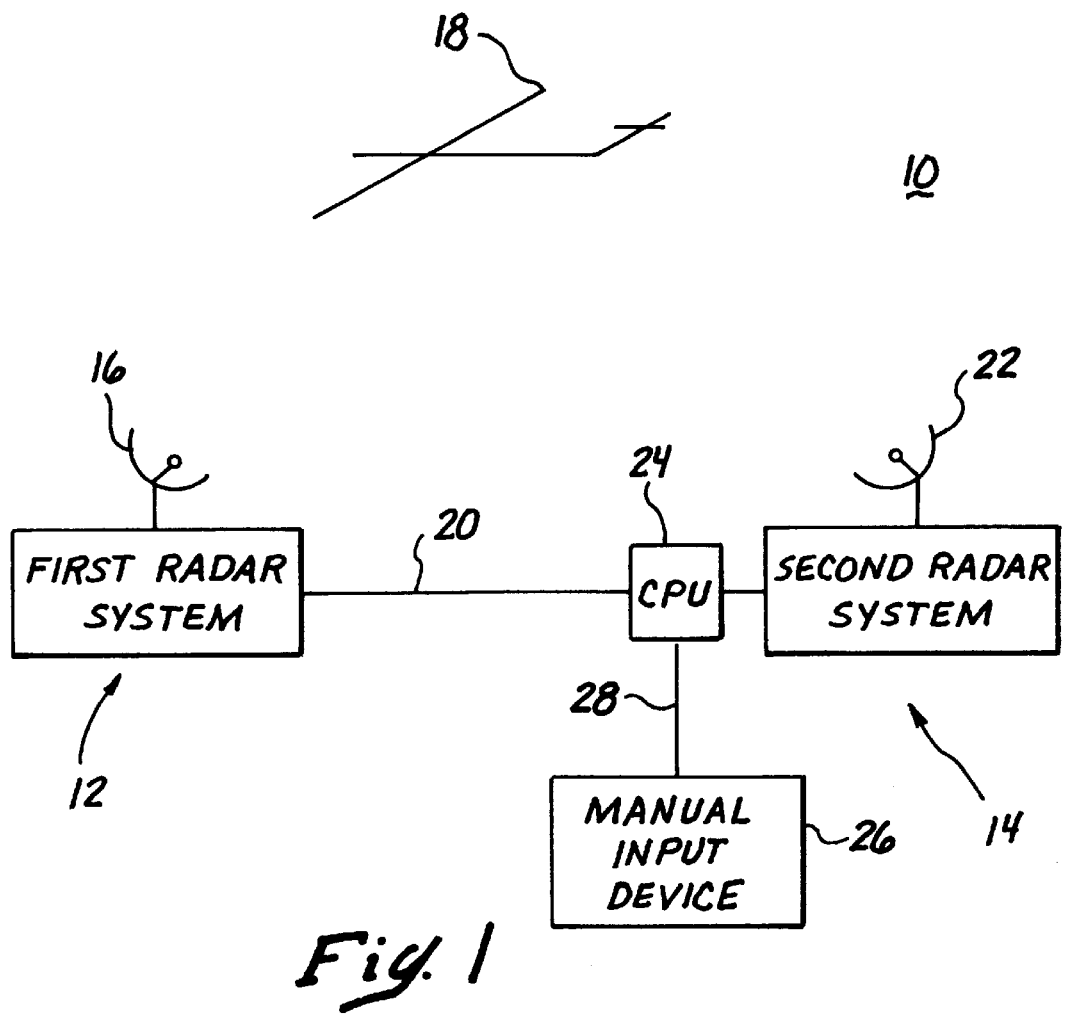
FIG. 1 shows a schematic view of a radar tracking system with a first radar system and a second radar system.

Referring to the figures, and specifically to FIG. 1, a radar tracking system 10 comprises a first radar system 12 and a second radar system 14. The first radar system 12 has an antenna 16. The first radar system 12 tracks a target 18, estimates its range, and sends a signal 20 representing the target range estimate to the second radar system 14. Other embodiments of the invention may send additional target data signals (e.g., target velocity, acceleration, other characteristics) from the first radar system 12 to the second radar system 14.

The second radar system 14 comprises an antenna 22, a CPU 24, and a manual input device 26. The CPU 24 receives the target range estimate signal 20 through a signal input device (not shown). The CPU 24 also receives manually inputted data 28 through the manual input device 26.

The CPU 24 processes the target range estimate to determine a usable pulse repetition frequency ("PRF") for the second radar 14. Embodiments of the invention may use a zero eclipsing algorithm to determine a set of PRFs that permits an interval "n" to be a zero eclipse interval. A zero eclipse interval does not have the transmitter pulse occurring during the reception of the target signal. Embodiments of the invention may use a clear Doppler frequency algorithm to determine a set of PRFs that permits an interval "m" to be a clear Doppler frequency interval. A clear Doppler frequency has a clear Doppler region that is free of clutter bandwidth. In a preferred embodiment of the invention, the CPU 24 uses an combination of the zero eclipsing algorithm and the clear Doppler frequency algorithm.

Figure 2:
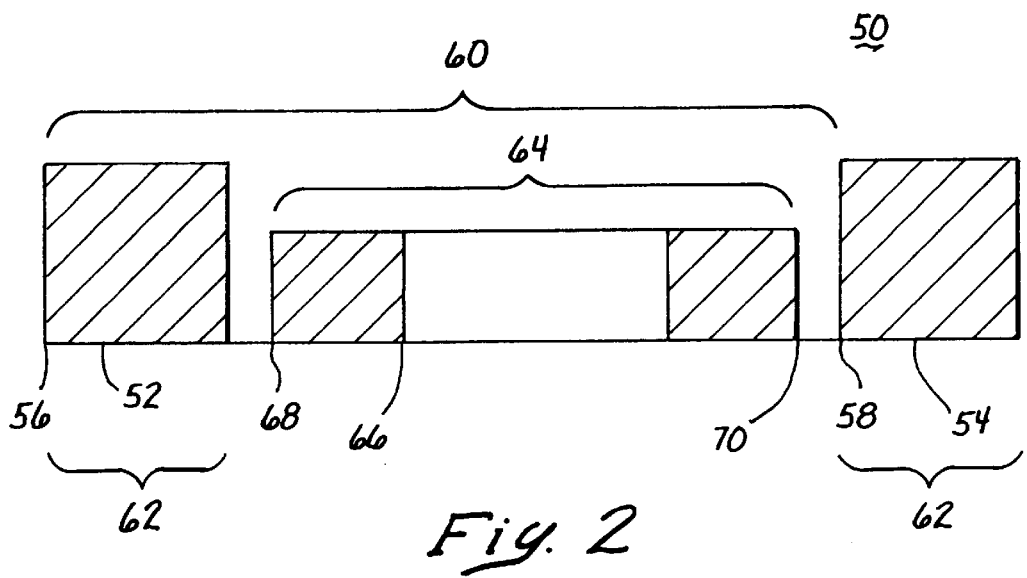
FIG. 2 graphically shows the time constraints on pulse repetition frequencies that permit a zero eclipsing pulse repetition frequency.

A set of zero eclipsing PRF intervals can be determined over a range of intervals given the estimated target range, Rcue, desired duty factor, df, and half of the range uncertainty swath, dR. Referring now to FIG. 2, a visual representation 50 of the time constraints in identifying a zero eclipsing PRF interval is shown. Signal 52 is the transmitted pulse at n and Signal 54 is the transmitted pulse at n+1. The beginnings 56 and 58 of the signals 52 and 54 are separated by the interpulse period Rprf 60 of the PRF. The width 62 of the transmitted pulses is the df times the Rprf 60. An intervening receiver-on time 64 is between the pulses 52 and 54. The Rcue 66 is shown near the middle of the receiver-on time 64. A beginning 68 of the receiver-on time 64 is represented by equation (1) and the ending 70 of the receiver-on time 64 is represented by equation (2):

$$Rcue-dR \quad (1)$$

$$Rcue+dR+df*Rprf \quad (2)$$

The zero eclipsing algorithm comprises equations which are solved to determine zero eclipsing intervals "n". Based on the time constraints of the algorithm, the inequalities (3) and (4) are true:

$$Rcue-dR>n*Rprf+df*Rprf \quad (3)$$

$$Rcue+dR+df*Rprf<(n+1)*Rprf \quad (4)$$

wherein:

n=zero eclipse interval;

df=desired duty factor;

Rcue=estimate of target range; and dR=half of the range uncertainty swath.

As the relation between Rprf and PRF is expressed by equation (5):

$$PRF=c/(2* Rprf) \quad (5)$$

wherein c=the speed of light;

a set of zero eclipsing PRFs is represented by the equations (6)–(8)

$$Frh=(c/2)*(n+1-df)/(Rcue+dR) \quad (6)$$

$$Frl=(c/2)*(n+df)/(Rcue+dR) \quad (7)$$

$$Frh \geq Fr_{RANGE} \geq Frl \quad (8)$$

wherein:

Frh=highest zero eclipsing PRF for n;

Frl=lowest zero eclipsing PRF for n;

$Fr_{RANGE}$=range of zero eclipsing PRFs for n.

The set of zero eclipsing intervals, n, consists of all intervals for which the equations (6)–(8) hold true. The zero eclipsing algorithm then either selects, or assisting in manually selecting, a usable RPF. In some embodiments of the invention, the instructions in the CPU 24 choose a usable RPF from the $Fr_{RANGE}$ having the lowest value of n. In a more preferred embodiment, the instructions in the CPU 24 chose the lowest available PRF as the usable PRF. Some embodiments of the invention have an algorithm that tests to ensure that the usable RPF is above a minimum RPF for the second radar system 14. Additional embodiments of the invention may solicit a manual choice of the usable RPF from a generated list of zero eclipsing PRFs, the manual choice being inputted through the manual input device 26 (FIG. 1).

Figure 3:
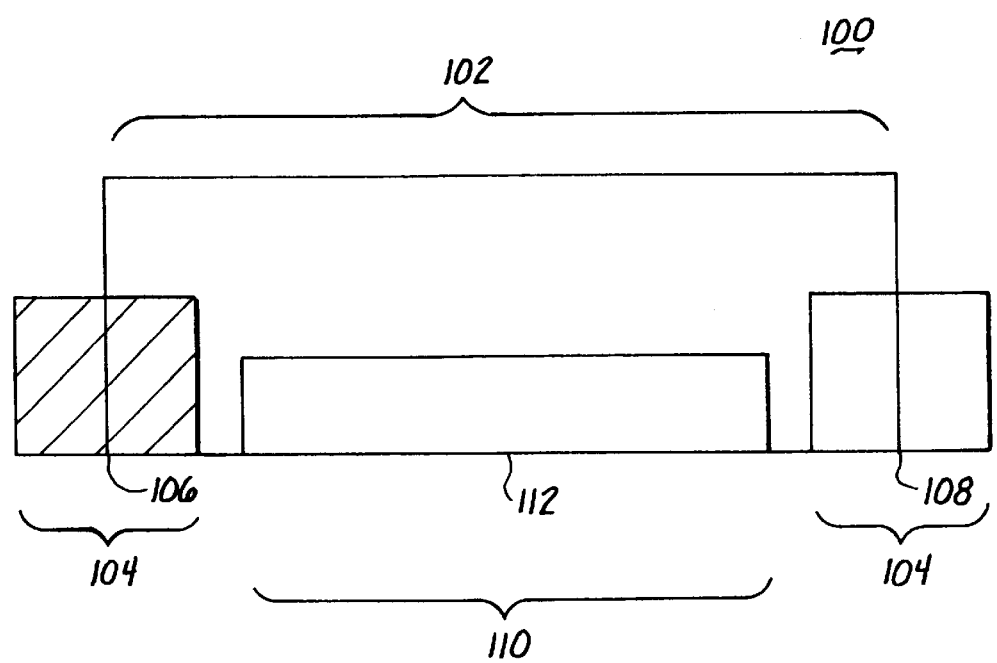
FIG. 3 graphically shows the Doppler frequency constraints on pulse repetition frequencies that permit a clear Doppler frequency pulse repetition frequency.

In another embodiment of the invention, the clear Doppler frequency algorithm determines a set of PRFs that permit a clear Doppler frequency interval "m" given the estimated target range, Rcue, desired duty factor, df, the Doppler uncertainty swath, ΔF, the center of a clear Doppler frequency region, fc, and the clutter bandwidth, Bwc. Now referring to FIG. 3, a visual representation 100 of the frequency constraints on the clear Doppler frequency region interval is shown. A PRF 102 has Bwc's 104 centered on the PRF's beginning end 106 and terminating end 108. Between the Bwc's 104 is a clear Doppler region 110, or the Doppler uncertainty swath, ΔF. At the middle 112 of the region 110 is the center of the clear Doppler frequency region, fc.

The clear Doppler frequency algorithm is also representable through equations (9)–(11):

$$Ffh=(fc-\Delta F/2-Bwc/2)/m \quad (9)$$

$$Ffl=(fc+\Delta F/2+Bwc/2)/(m+1) \quad (10)$$

$$Ffh \geq Ff_{RANGE} \geq Ffl \quad (11)$$

wherein:

m=clear Doppler frequency region interval;

Ffh=highest Doppler frequency pulse repetition frequency for m;

Ffl=lowest Doppler frequency pulse repetition frequency for m;

fc=center of a clear Doppler frequency region;

ΔF=Doppler uncertainty swath;

Bwc=clutter bandwidth; and $Ff_{RANGE}$=range of Doppler frequency pulse repetition frequencies for m;

The set of clear Doppler frequency region intervals, m, consists of all the intervals for which the equations (9)–(11) hold true. The clear Doppler frequency algorithm then selects a usable RPF from the set of $Ff_{RANGES}$. In some embodiments of the invention, the instructions in the CPU 24 choose a usable RPF from the $Ff_{RANGE}$ having the lowest m. In a more preferred embodiment, the algorithm chooses the lowest PRF in the $Ff_{RANGE}$ having the lowest m as the usable RPF. Some embodiments of the invention have an algorithm that tests to ensure that the usable RPF is above a minimum RPF for the second radar system 14. Additional embodiments of the invention may solicit a manual choice of the usable RPF from a generated list of clear Doppler frequency RPFS, the manual choice being inputted through the manual input device 26 (FIG. 1).

In an embodiment of the invention, the usable PRF is chosen from the intersection of an $Fr_{RANGE}$ and an $Ff_{RANGE}$. In a preferred embodiment of the invention, the usable PRF is chosen from the lowest n $Fr_{RANGE}$ that has a matching PRF in any $Ff_{RANGE}$, wherein the $Ff_{RANGEs}$ with matching PRF's are referred to as $Ff_{RANGE}$ matching ranges. In a more preferred embodiment of the invention, the usable PRF is chosen from the lowest n $Fr_{RANGE}$ and the $Ff_{RANGE}$ matching range with the lowest m. In another embodiment of the invention, the usable PRF is chosen from the lowest m $Ff_{RANGE}$ that has a matching PRF in any $Fr_{RANGE}$, wherein the $Fr_{RANGEs}$ with matching PRF's are referred to as $Fr_{RANGE}$ matching ranges. In a more preferred embodiment of the invention, the usable PRF is chosen from the lowest m $Ff_{RANGE}$ and the $Fr_{RANGE}$ matching range with the lowest n.

Figure 4:
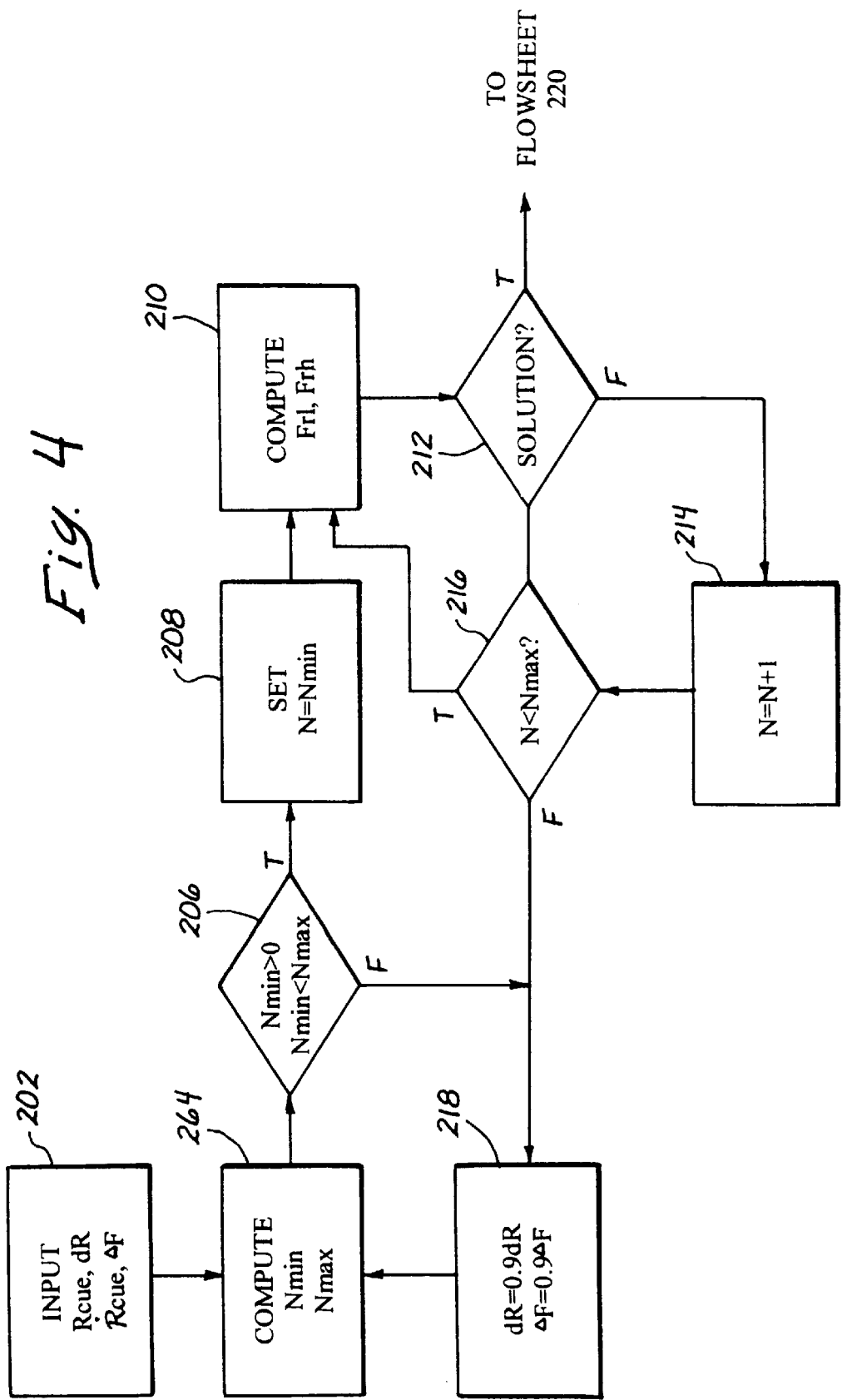
FIG. 4 shows a flow diagram of the steps and decisions to determine a zero eclipsing pulse repetition frequency.
Figure 5:
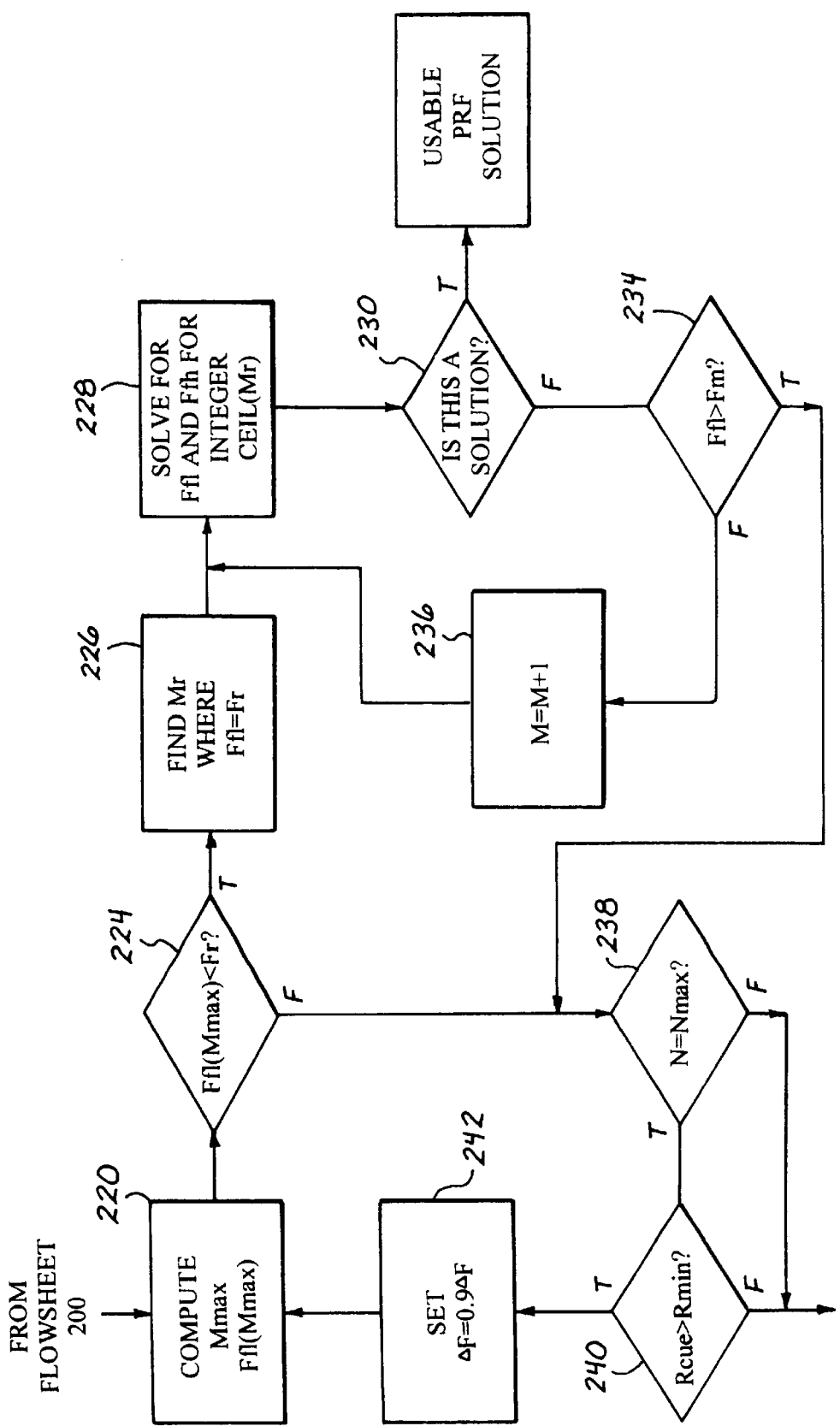
FIG. 5 shows a flow diagram of the steps and decisions to determine a clear Doppler frequency pulse repetition frequency.

In a preferred embodiment of the invention, the CPU 24 of the second radar system 14 (see FIG. 1) is instructed to choose a usable PRF via a set instructions. FIG. 4 shows a flow chart 200 that is an example of a set of instructions for choosing a usable PRF that is zero eclipsing. FIG. 5 shows a flow chart 220 that is an example of a set of instructions for choosing a usable PRF that has a clear Doppler frequency region. The flow charts are linked so that the usable PRF is a member of the lowest zero eclipse interval and a member of the lowest matching clear Doppler frequency region. From the flow chart 200, it is commonly known in the art how to translate the set of instructions into any usable computer language, how to "hard wire" the instructions, or a combination thereof into the CPU 24.

Referring now to FIG. 4, flow chart 200 starts with a step 202 of inputting target data comprising Rcue, Rdotcue, dR, and dF. Rdotcue is the velocity of the target. The target data is received from the first radar system and/or is inputted manually. Next, step 204 computes $n_{min}$ and $n_{max}$ using equations (12) and (13):

$$n_{min} = \text{ceil}(F_{min}*(T_{rc}+T_{dr})+df-1) \quad (12)$$

$$n_{max} = \text{floor}(T_{rc}(1-2df)/(2T_{dr})) \quad (13)$$

wherein:

$F_{min}$ ≜ minumum PRF (determined by hardware paramenters, such as IF bandwidth, or inputred by an operator)

$T_{rc}$≜$2R_{cue}/c$ (the cued ranged to the target in seconds)

$T_{dr}$=$2dR/c$ ≜ (the size of the range uncertainity swath of the target in seconds)

Next, in decision 206, $n_{min}$ is tested to see if it is above zero and $n_{max}$ is tested to see if it is above $n_{min}$. If decision 206 is true, the next step 208 sets n equal to $n_{min}$. If the tests are false, step 218 is taken (described below). After step 208, step 210 computes Frh and Frl using, equations (6) and (7). The next decision 212 determnines whether Frh is greater than Frmin and if Frh is great than Frl. Frmin is the minimum PRF and it is dictated by the hardware limitations, such as the IF filter bandwidth. If decision 212 is true, step 222 in the flowchart 220 is next. If the decision is false, the next step is step 214 that increases n by one. In the next decision 216, n is tested to determine if it is less than $n_{max}$. If true, the next step is step 210 and another Frh and Frl is computed. If the test is false, the next step 218 reduces dR and df by 10%, after which a new $n_{min}$ and $n_{max}$ is computed in step 204.

Now referring, to flow chart 220, in step 202 $m_{max}$ and Ffl($m_{max}$) is computed using equations (14) and (15):

$$m_{max} = \text{floor}\frac{f_c - \Delta F/2 - B_{wc}/2}{\Delta F + B_{wc}/2} \quad (14)$$

$$Ffl(m_{max}) = \frac{f_c + \Delta F/2 + B_{wc}/2}{(m_{max}+1)} \quad (15)$$

wherein:

fc=center of a clear Doppler frequency region;

$B_{wc}$ ≜ bandwidth of main lobe clutter

Next, in decision 224, Ffl($m_{max}$) is tested to determine if it is less than the current estimate of PRF, designated as Fr. If decision 224 is false, the next decision 238 occurs (described below). If decision 224 is true, the next step 226 finds $M_{96}$ where Ffl =Fr using equations (16)–(18):

$$M_r = \text{ceil}(M_r) \quad (16)$$

$$Ffl = \frac{f_c + \Delta F/2 + B_{wc}/2}{(M_r+1)} \quad (17)$$

$$Ffh = \frac{f_c + \Delta F/2 + B_{wc}/2}{M_r} \quad (18)$$

After step 226, step 228 solves for Ffh and Ffl using equations (9) and (10). Next, in decision 230, equation (19) is tested:

$$Ft<Fh \quad (19)$$

wherein

Fh=minimum of (Ffh, Frh); and

Fl=maximum of (Ffl, Frl).

If the decision 230 is true, in the next step 232 the usable PRF is Fl and the flow chart 220 stops. If the decision 230 is false, in the next decision 234, Ffl is tested to determine if it is greater than Frh. If decision 234 is true, decision 238 is next. If step 234 is false, m is increased by one in step 236 and step 228 follows. In decision 238, n is tested to determine if it equals $n_{max}$. If decision 238 is false, step 214 in flowchart 200 is next. If decision 238 is true, in decision 240 Rcue is tested to determine if it is greater than Rmin, the minimum range for Rcue. If decision 240 is false, step 214 in flowchart 200 is next. If decision 240 is true, step 242 reduces DW1 and DW2 by 10%, with step 222 being next.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

We claim:

1. A process for radar tracking of a target comprising the steps of:

a. retrieving an estimate of a target range and a range uncertainty swath from a first radar system;

b. inputting the estimate of the target range, the range uncertainty swath, and a duty factor into a second radar system;

c. instructing the second radar system to determine a set of zero eclipse intervals, and respective ranges of range pulse repetition frequencies, which solve equations (1)–(3):

$$Frh=(c/2)*(n+1-df)/(Rcue+dR) \quad (1)$$

$$Frl=(c/2)*(n+df)/(Rcue+dR) \quad (2)$$

$$Frh \geq Fr_{RANGE} \geq Frl \quad (3)$$

wherein:

n=zero eclipse interval;

Frh=highest range pulse repetition frequency for n;

Frl=lowest range pulse repetition frequency for n;

c=speed of light;

df=desired duty factor;

Rcue=estimate of target range;

dR=half of the range uncertainty swath; and $Fr_{RANGE}$=range of range pulse repetition frequencies for n;

d. choosing a particular range pulse repetition frequency from the ranges of range pulse repetition frequencies determined in step c from the set of zero eclipse intervals; and e. instructing the second radar system to track the target using the chosen range pulse repetition frequency.

2. The process of claim 1, wherein the particular range pulse repetition frequency is a member of the range of range pulse repetition frequencies for the lowest zero eclipse interval.

3. The process of claim 1, wherein said second radar system is a missile guidance system.

4. The process of claim 1, further comprising the steps of:
   a. estimating a target Doppler frequency region and a Doppler uncertainty swath;
   b. inputting the center of the clear Doppler frequency region and the Doppler uncertainty swath into the second radar system;
   c. instructing the second radar system to determine a set of clear Doppler frequency region intervals, and respective ranges of Doppler frequency pulse repetition frequencies, which solve equations (4)–(6):

$$Ffh=(fc-\Delta F/2-Bwc/2)/m \qquad (4)$$

$$Ffl=(fc+\Delta F/2+Bwc/2)/(m+1) \qquad (5)$$

$$Ffh \geq Ff_{RANGE} \geq Ffl \qquad (6)$$

wherein:
   m=clear Doppler frequency region interval;
   Ffh=highest Doppler frequency pulse repetition frequency for m;
   Ffl=lowest Doppler frequency pulse repetition frequency for m;
   fc=center of a clear Doppler frequency region;
   $\Delta F$=Doppler uncertainty swath;
   Bwc=clutter bandwidth; and
   $Ff_{RANGE}$=range of Doppler frequency pulse repetition frequencies for m;

d. choosing a particular pulse repetition frequency that is present in at least one of the ranges of range pulse repetition frequencies and that is present in at least one of the ranges of Doppler frequency pulse repetition frequencies; and
   e. instructing the second radar system to track the target using the particular pulse repetition frequency.

5. The process of claim 4, wherein the choosing step further comprises the steps of:
   a. identifying a lowest zero eclipse interval range of range pulse repetition frequencies that has one or more matching pulse repetition frequencies in one or more of the ranges of Doppler frequency pulse repetition frequencies, wherein the ranges of Doppler frequency pulse repetition frequencies with one or more matching pulse repetition frequencies define matching ranges; and
   b. choosing one of the matching pulse repetition frequencies as the particular pulse repetition frequency.

6. The process of claim 5, wherein the choosing step further comprises the step of choosing the matching pulse repetition frequency from the matching range having the lowest clear Doppler frequency region interval.

7. The process of claim 4, wherein the choosing step further comprises the steps of:
   a. identifying a lowest clear Doppler frequency region interval range of Doppler frequency pulse frequencies for that has one or more matching pulse repetition frequencies in one or more of the ranges of range pulse repetition frequencies, wherein the ranges of range pulse repetition frequencies with one or more matching pulse repetition frequencies define matching ranges; and
   b. choosing one of the matching pulse repetition frequencies as the particular pulse repetition frequency.

8. The process of claim 7, wherein the choosing step further comprises the step of choosing the matching pulse repetition frequency from the matching range having the lowest zero eclipse interval.

9. A process for radar tracking of a target comprising the steps of:
   a. retrieving an estimate of a target range, a center of a clear Doppler frequency region, and a Doppler uncertainty swath from a first radar system;
   b. inputting the center of the clear Doppler frequency region and the Doppler uncertainty swath into a second radar system;
   c. instructing the second radar system to determine a set of clear Doppler frequency region intervals, and respective ranges of Doppler frequency pulse repetition frequencies, which solve equations (4)–(6):

$$Ffh=(fc-\Delta F/2-Bwc/2)/m \qquad (4)$$

$$Ffl>(fc+\Delta F/2+Bwc/2)/(m+1) \qquad (5)$$

$$Ffh>Ff_{RANGE} \geq Ffl \qquad (6)$$

wherein:
   m=clear Doppler frequency region interval;
   Ffh=highest Doppler frequency pulse repetition frequency for m;
   Ffl=lowest Doppler frequency pulse repetition frequency for m;
   fc=center of a clear Doppler frequency region;
   $\Delta F$=Doppler uncertainty swath;
   Bwc=clutter bandwidth; and
   $Ff_{RANGE}$=range of Doppler frequency pulse repetition frequencies for m;

d. choosing a particular Doppler frequency pulse repetition frequency from the ranges of Doppler frequency pulse repetition frequencies from the set of clear Doppler frequency region intervals; and
   e. instructing the second radar system to track the target using the particular Doppler frequency pulse repetition frequency.

10. The process of claim 9, wherein the particular Doppler frequency pulse repetition frequency is a member of the lowest clear Doppler frequency region interval range of Doppler frequency pulse repetition frequencies.

11. The process of claim 9, wherein said second radar system is a missile guidance system.

12. A radar tracking system for tracking a target in a target range comprising:
   a. a first radar system comprising means for making a target range estimate and sending a signal representing the target range estimate; and
   b. a second radar system comprising:
      i. a central processing unit comprising a signal input device for receiving target data comprising the target range estimate signal, a range of uncertainty swath, and a duty factor;

ii. zero eclipse code for determining from the target data a set of zero eclipse intervals, and respective ranges of range pulse repetition frequencies, by solving equations (1)–(3):

$$Frh = (c/2)*(n+1-df)/(Rcue+dR) \quad (1)$$

$$Frl = (c/2)*(n+df)/(Rcue+dR) \quad (2)$$

$$Frh \geq Fr_{RANGE} \geq Frl \quad (3)$$

wherein:
n=zero eclipse interval;
Frh=highest range pulse repetition frequency for n;
Frl=lowest range pulse repetition frequency for n;
c=speed of light;
df=desired duty factor;
Rcue=estimate of target range;
dR=half of the range uncertainty swath; and
$Fr_{RANGE}$=range of range pulse repetition frequencies for n;

iii. first means for choosing a usable range pulse repetition frequency from the ranges of range pulse repetition frequencies from the set of zero eclipse intervals; and iv. means for instructing the second radar system to track the target using the particular range pulse repetition frequency.

13. The system of claim 12, wherein the central process unit comprises:

a. clear Doppler frequency code for estimating a center of a clear Doppler frequency region and a Doppler uncertainty swath from the estimate of the target range, and for determining a set of clear Doppler frequency region intervals, and respective ranges of Doppler frequency pulse repetition frequencies, which solves equations (4)–(6):

$$Ffh = (fc - \Delta F/2 - Bwc/2)/m \quad (4)$$

$$Ffl = (fc + \Delta F/2 + Bwc/2)/(m+1) \quad (5)$$

$$Ffh \geq Ff_{RANGE} \geq Ffl \quad (6)$$

wherein:
m=clear Doppler frequency region interval;
Ffh=highest Doppler frequency pulse repetition frequency for m;
Ffl=lowest Doppler frequency pulse repetition frequency for m;
fc=center of a clear Doppler frequency region;
$\Delta F$=Doppler uncertainty swath;
Bwc=clutter bandwidth; and
$Ff_{RANGE}$=range of Doppler frequency pulse repetition frequencies for m; and b. second means for choosing a particular pulse repetition frequency that is present in at least one of the ranges of range pulse repetition frequencies and that is present in at least one of the ranges of Doppler frequency pulse repetition frequencies.

14. The system of claim 13, wherein the second means for choosing further comprises:

a. means for identifying a lowest zero eclipse interval range of range pulse repetition frequencies that has one or more matching pulse repetition frequencies in one or more of the ranges of Doppler frequency pulse repetition frequencies, wherein the ranges of Doppler frequency pulse repetition frequencies with one or more matching pulse repetition frequencies define matching ranges; and b. third means for choosing one of the matching pulse repetition frequencies as the particular pulse repetition frequency.

15. The system of claim 14, wherein the third means for choosing further comprises fourth means for choosing the matching pulse repetition frequency from the matching range having the lowest respective clear Doppler frequency region interval.

16. The system of claim 13, wherein the second means for choosing further comprises:

a. means for identifying a lowest clear Doppler frequency region interval range of Doppler frequency pulse repetition frequencies that has one or more matching pulse repetition frequencies in one or more of the ranges of range pulse repetition frequencies, wherein the ranges of range pulse repetition frequencies with one or more matching pulse repetition frequencies define matching ranges; and b. fifth means for choosing one of the matching pulse repetition frequencies as the particular pulse repetition frequency.

17. The process of claim 16, wherein the third means for choosing further comprises sixth means for choosing the matching pulse repetition frequency from the matching range having the lowest zero eclipse interval.

* * * * *